Oct. 2, 1956

A. A. LIEBELT 2,765,065

DOUGH LUMP SPACER

Filed June 23, 1951

INVENTOR.
Adolph A. Liebelt.
BY
Wood, Herron & Evans.
ATTORNEYS.

Oct. 2, 1956  A. A. LIEBELT  2,765,065
DOUGH LUMP SPACER
Filed June 23, 1951   7 Sheets-Sheet 3

INVENTOR.
Adolph A. Liebelt.
BY
Wood, Herron & Evans.
ATTORNEYS.

Oct. 2, 1956  A. A. LIEBELT  2,765,065
DOUGH LUMP SPACER
Filed June 23, 1951  7 Sheets-Sheet 4

INVENTOR.
Adolph A. Liebelt.
BY
Wood, Herron & Evans.
ATTORNEYS.

Oct. 2, 1956

A. A. LIEBELT 2,765,065

DOUGH LUMP SPACER

Filed June 23, 1951

INVENTOR.
Adolph A. Liebelt.
BY
Wood, Herron & Evans.
ATTORNEYS.

Oct. 2, 1956

A. A. LIEBELT 2,765,065

DOUGH LUMP SPACER

Filed June 23, 1951

INVENTOR.
Adolph A. Liebelt.
BY
Wood, Herron & Evans.
ATTORNEYS.

United States Patent Office 2,765,065
Patented Oct. 2, 1956

2,765,065

DOUGH LUMP SPACER

Adolph A. Liebelt, Cincinnati, Ohio

Application June 23, 1951, Serial No. 233,167

8 Claims. (Cl. 198—34)

This invention relates to dough lump spacers of the type which are employed in conjunction with modern, high speed bakery equipment, to deliver dough lumps, which are discharged from one machine at an irregular rate, to a succeeding machine at a constant rate, in a uniformly spaced succession.

The dough lump spacer of the present invention may be used to space dough lumps of any size and type, from small rolls and buns to large loaves of bread. As an example of its utility the spacer is disclosed in an installation producing loaves of bread. However, the spacing problem encountered in such an installation is similar in most respects to that encountered in roll and bun production and the functioning of the spacer is the same no matter what type of bakery goods is being processed.

In a modern bakery, producing several thousand loaves of bread per hour, the dough is handled almost entirely by machinery. This is particularly true of that portion of the bread making process which takes place after the dough has been divided into lumps of the proper size. From the time that the dough lumps are ejected from the divider, until they are finally deposited in baking pans, ready to be placed in the oven, the lumps are processed by a series of automatic machines, each of which deposits them onto one of a series of continuously moving endless conveyors by which they are fed to the next machine.

Prior to baking, the dough lumps are in a tacky, plastic state and tend to adhere to any part of a machine with which they come in contact and will readily adhere to one another to form "doubles." Moreover, the behavior of the dough lumps is very erratic since it is affected by such varying conditions as temperature, humidity, amount of flouring, moisture content and the like. Great care must be exercised in handling dough since even a single double may clog up a machine and cause it to become jammed with dough. If this happens, the whole production line must be shut down for several minutes while the accumulated dough is removed from the jammed machine.

The problem of keeping a bakery production line in continuous operation, without shut downs occasioned by dough jams, has been made increasingly difficult by the trend in recent years to raise production by increasing the rate at which each machine handles the dough lumps. A machine which handles dough lumps at a rate of over 100 a minute requires that the lumps be fed to it in an accurately spaced succession. If the lumps are fed in random fashion, and any lump is spaced too close to the one preceding it, the lumps will be forced together, forming a double, which is likely to clog up either the device in which it is formed or one of the devices subsequently handling the dough. It is highly essential, therefore, to provide a means by which dough lumps may be fed to a machine at a very rapid rate but, nevertheless, in a succession in which a uniform space is maintained between the lumps.

Heretofore, a number of devices have been utilized for spacing dough lumps between machines which are serially arranged in a production line. These devices have not been entirely successful in accurately spacing the lumps as witnessed by the fact that at the present time it is not unusual to have doubles formed at a rate as high as 10% of all of the lumps handled. It is customary, at present, to have an attendant whose duty it is to watch the conveyors and manually remove any doubles which have been formed. These doubles are then returned either to the mixer where they are intermixed with a fresh batch of dough and completely reprocessed, or more commonly to the divider where they are rescaled along with a quantity of fresh dough and passed through the rest of the bakery production line in the usual manner. Either procedure is extremely wasteful since it not only requires additional labor but also each lump which must be reprocessed reduces by that amount the total output of the bakery. Moreover, when doubles are returned directly to the divider, they are not properly scaled due to their relatively high degree of compaction as compared with the fresh dough for which the dividers are set, and the loaves produced from this dough and any other dough with which it has become intermixed are apt to be of inferior quality.

The present invention is directed to a novel dough lump spacer which is adapted to receive lumps from a conveyor upon which they are irregularly spaced and, by accurately controlling their movement, to discharge them in a continuous succession with an extremely uniform spacing between lumps, thereby preventing the formation of doubles in any subsequent dough handling operation. Furthermore, the spacer is effective to separate into individual lumps any doubles which have been formed in previous machines or transfer devices. Thus, every lump which is formed in the divider emerges from the oven as a loaf of bread and the need for an attendant to remove doubles from the conveyor system and return them to the mixer to be processed a second time is wholly eliminated.

Generally, the spacer of this invention comprises a plurality of live rolls which constitute a dough supporting surface and which are arranged with their rotative axes transverse to the line of dough movement in closely spaced parallel relationship. The first roller, or first few rollers, are perferably driven at a relatively high rate of speed and each of the successive rolls is driven at a progressively slower speed. The separator, or final roller of the series, however, is speeded up to rotate at a speed which is higher than that of the preceding roller. Additionally, I have found it preferable to provide an adjustable discharge roller which cooperates with the separator roll in discharging lumps from the spacer. The discharge roller is spaced from the separator roll and rotates in the opposite direction from that roll so that as the dough lumps pass between them they are gripped on opposite sides and are positively accelerated.

As the dough lumps are successively fed to the spacer from an endless conveyor, there is an initial acceleration of each dough lump caused by its contact with the first roller. This initial acceleration is extremely effective in causing separation of any doubles, or overlapping dough lumps, which have been formed in previous devices. After the initial acceleration, each dough lump is progressively slowed down by the slower moving rollers so that a succession of dough lumps in endwise abutment is formed on the spacer rolls. Finally, each dough lump is accelerated by contact with the separator roll and discharge roll to uniformly space it from the following lumps. It will be noted that by first bringing the dough lumps into abutment before they are accelerated by the separator roller, an extremely uniform spacing is secured between the lumps as they are discharged from the spacer regardless of any irregular manner in which they may be delivered to the spacer.

To illustrate its utility, the dough lump spacer will be discussed with reference to a bread production line in which it is placed between the discharge end of the proofer and the first sheeting rolls of the moulder. However, it will be understood that the dough lump spacer may be used advantageously in the production of articles other than bread, such as buns, rolls and the like, and may be placed between any two devices in a bakery production line, such as a divider and rounder, or rounder and proofer, where similar problems of spacing and separating doubles are present.

The moulder receives the dough lumps after they have been discharged from the proofer, in which they have recuperated from the effects of dividing and rounding. In the moulder the dough lumps pass through one or more sets of rolls by which the lumps are flattened into a relatively thin sheet and the sheets are then curled into spirally wound rolls which are deposited in baking pans for delivery to the oven.

The advent of high speed dividers and rounders and large capacity proofers has made the output of the moulder the limiting factor in determining the rate of production of the entire bakery. It has been found that it is impractical to materially increase the speed of the moulder rolls without adversely affecting the quality of the finished loaves of bread so that the problem of raising moulder production rate centers itself about feeding a maximum number of dough lumps per unit of time to the moulder feeding rolls.

Theoretically, to obtain maximum production the lumps should pass through the sheeting rolls in a continuous stream with the lumps in end to end abutment. However, this would require that the lumps be fed to the sheeting rolls in critically precise timed relation and also that each lump of dough be of exactly the same size as every other lump. If the precise timed relationship were not maintained and the lumps were fed too rapidly, or if one lump was slightly oversize, two or more lumps would be forced together, causing the formation of doubles. As a result, the rolls of the moulder would likely become clogged necessitating a complete shut down of the production line while the accumulated dough was cleaned from the moulder.

In practice, if the lumps are fed to the moulder directly from the discharge conveyor of the proofer, they must be spaced an excessive distance apart, to allow for the wide variations in spacing between adjacent lumps on the proofer discharge conveyor. As a result, a considerable portion of the time the moulder rolls are turning but are not compressing dough lumps so that the moulder production rate is far below its theoretical maximum.

The irregularity of the spacing of lumps upon the proofer discharge conveyor is due to a number of factors: In the first place, the dough lumps are usually discharged from the proofer through gravity chutes in which lump movement is erratic. That is, some lumps slide more rapidly than others and hence come to rest on the discharge conveyor more closely to the preceding lump. Furthermore, the conveyor from the proofer to the spacer often comprises not one but a plurality of belts and the dough lumps are transferred from one belt to another by dropping them from an elevated belt onto one at a slightly lower level. As each lump drops, it tends to roll slightly in one direction or the other. Thus, each transfer from belt to belt introduces a small error in the spacing of the dough lumps and, while this error may be cancelled out by successive transfers, it may be compounded and appreciable non-uniformity produced in dough lump spacing. The successive transfers of dough lumps from conveyor to conveyor may even compound the spacing error to such an extent that succeeding dough lumps are overlapped to form doubles.

By placing a spacer, constructed in accordance with the present invention, between the proofer discharge belt and the moulder, the lumps may be fed to the sheeting rolls of the moulder in an accurately timed succession. The spacing of the dough lumps can be so closely controlled that the distance between adjacent lumps may be reduced to an absolute minimum and the moulder run at near theoretical efficiency without the formation of doubles.

Even when a bakery is running at less than full capacity it is desirable to deliver dough lumps to the moulder in a continuous, timed succession. The moulder flouring devices, in present use, are designed to provide proper flouring for a substantially continuous lump movement through the sheeting rolls. If an appreciable time interval occurs between successive lumps an excessive amount of flour will be deposited upon the rolls and will be picked up by the next lump which is sheeted, causing imperfections in the finished loaf. When a bakery is running at partial capacity and a pocket-type proofer is employed, the proofer is generally run with some pockets empty. As a result, the lumps on the proofer discharge conveyor are very unevenly spaced, there being a relatively great distance corresponding to empty proofer pockets between some lumps, and a normal or relatively small distance between others. The spacer of the present invention provides, in effect, a reservoir in the form of a line of dough lumps in endwise abutment so that the irregularity of lump spacing due to this cause is not manifested in the feeding of dough lumps to the moulder.

I have found it preferable to use highly polished steel rollers since these rollers do not injure the dough when the lumps are in abutment, and the rollers are slipping beneath them. Furthermore, polished steel rollers provide sufficient traction to bring the lumps into abutment but do not force them together with sufficient force to cause them to amalgamate and form doubles.

It is an additional object of this invention to provide lateral guides which center the dough lumps transversely on the rollers before they are discharged from the spacer, thus preventing any damage to the dough edges due to misalignment of the lumps and the rollers of the moulder. The guides of the present invention may be quickly and accurately adjusted to accommodate dough lumps of varying sizes.

A further object of this invention is to provide a dough lump spacer which assists in the separation of any excess flour which has previously accumulated upon the dough lumps. Any excess flour remaining on the lumps is sifted between the spacer rolls, thus freeing the finished loaves of bread from hard, coarse lumps and similar defects.

A still further object of this invention is to provide a dough lump spacer which may be readily cleaned and maintained in a sanitary condition.

These, and other objects of my invention, will be apparent from a consideration of the specification in conjunction with the drawings in which.

Figure 1:
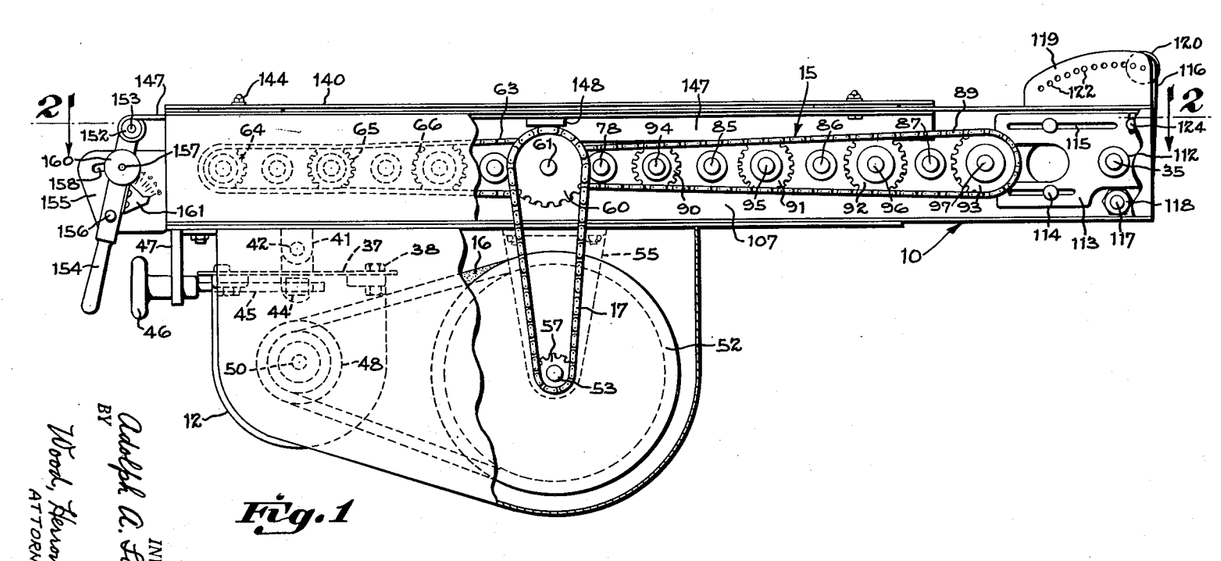
Figure 1 is a side elevational view of the spacer with the cover partially broken away to show details of the roller drive.
Figure 2:
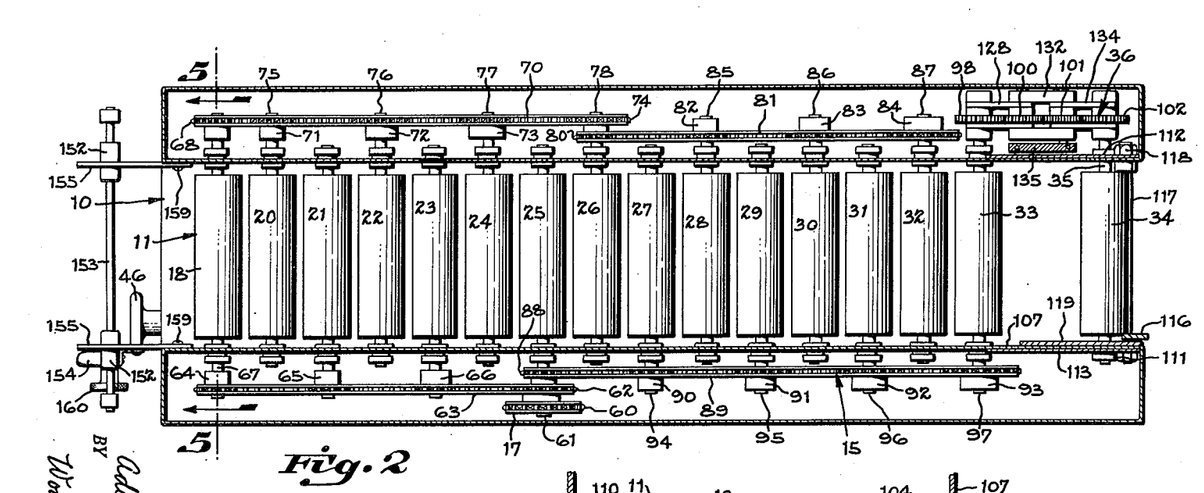
Figure 2 is a cross sectional view taken along line 2—2 of Figure 1.
Figure 3:
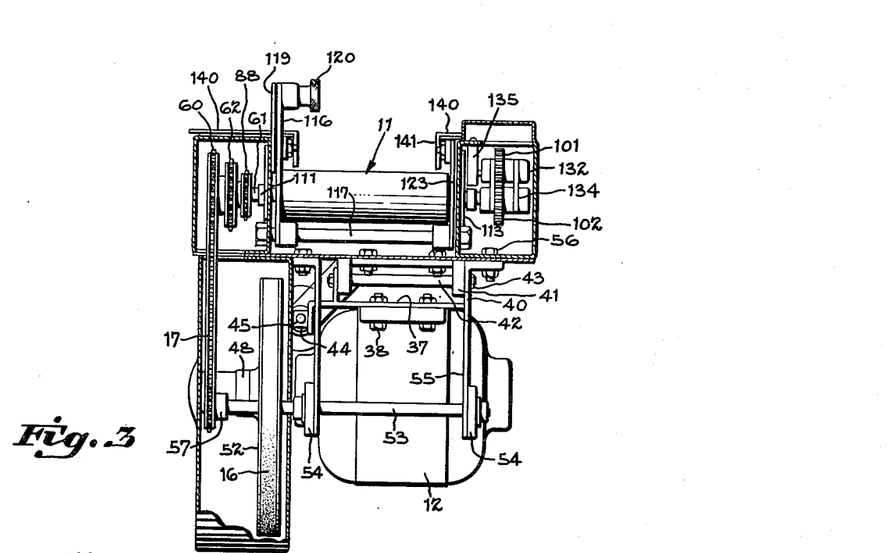
Figure 3 is an end view with the cover partially broken away.

As shown in Figures 1 and 2, the spacer generally comprises a frame 10, carrying a plurality of rollers 11, which constitute a dough supporting surface, and a motor 12 for driving the rollers 11. The rollers are mounted upon a series of shafts 13 which are arranged in parallel spaced relationship. Each of the shafts 13 has a sprocket 14 mounted thereon for engaging one of a series of endless chains 15 which are driven by motor 12 through belt 16 and drive chain 17.

Preferably, certain sprockets 14 are provided with varying numbers of teeth so that the rollers driven by those sprockets may be turned at different speeds relative to each other. In the preferred embodiment, the first rollers 18, 20, 21, 22 at the receiving end of the spacer are rotated at the highest rate of speed and each of the successive retarder rollers 23—32 is driven at a progressively slower speed. That is, roller 23 is turned less rapidly than roller 22, while roller 24 is rotated slower than roller 23, and so on. However, the final or separator roll, roller 33, at the discharge end of the spacer is rotated at a higher speed (in the preferred embodiment about 40% higher) than the adjacent retarder roller 32. An adjustable discharge roller 34 is provided to cooperate with separator roller 33 to discharge lumps from the spacer. The discharge roller does not form part of the dough supporting surface but rather is spaced from the separator roller 33 to permit dough lumps to pass downwardly between the two rollers. Discharge roller 34 is mounted upon shaft 35 which is driven through gear train 36 in the opposite direction from that which roll 33 is turned.

In the embodiment shown, dough lumps are deposited in an irregular succession upon roller 18, from the proofer discharge conveyor. They are given an initial acceleration by the first rollers of the spacer to effect a separation between any lumps which may have become overlapped. As the lumps are carried over the rollers 11 they are progressively retarded by the slower moving rollers of the dough carrying surface so that a succession of dough lumps in endwise abutment is formed over the rollers adjacent to the discharge end of the spacer. As the dough lumps are brought into engagement with separator roller 33 and discharge roller 34, they are serially accelerated to space each lump from the following one. The dough lumps then pass downwardly between the separator roller 33 and discharge roller 34 and are deposited in an accurately spaced succession upon another conveyor or directly in the first sheeting rolls of the moulder.

More specifically, the motor 12 is secured to plate 37 as by bolts and nuts 38. Plate 37 is provided with two upturned flanges 40 which are pivotally joined to depending brackets 41 by shaft 42 which is held in place by nuts 43. Plate 37 also has secured thereto a threaded block 44, adapted to engage adjusting screw 45. Adjusting screw 45 is joined to handle 46 which is carried by bracket 47 at the receiving end of the spacer.

A variable pitch pulley 48 is mounted upon motor shaft 50 for driving belt 16 which passes over pulley 52. Pulley 52 is mounted upon shaft 53 which is journaled in bearings 54 carried by brackets 55. Brackets 55 depend from frame 10 and are secured thereto, as by bolts 56. The tension in belt 16 may be adjusted by turning handle 46 to advance or withdraw screw 45 from block 44 thereby pivoting the plate 37 and motor 12 about the shaft 42.

Shaft 53 also carries sprocket 57 which engages drive chain 17. Drive chain 17 passes over sprocket 60 carried by shaft 61. A second sprocket 62, which is mounted on shaft 61, drives chain 63. The chain is effective to drive rollers 18, 21, and 23 through sprockets 64, 65, and 66, respectively.

Shaft 67 which carries roller 18 and sprocket 64 also carries sprocket 68 which drives chain 70. Chain 70 engages sprockets 71, 72, 73 and 74 rotating shafts 75, 76, 77, 78 and rollers 20, 22, 24 and 26.

Shaft 78 carrying roller 26 has a sprocket 80 mounted thereon in engagement with chain 81 which drives rollers 28, 30 and 32 through sprockets 82, 83 and 84 which are mounted upon shafts 85, 86 and 87, respectively. A third sprocket 88 is carried by shaft 61 and meshes with chain 89 to drive rollers 27, 29, 31 and 33 through sprockets 90, 91, 92 and 93 carried by shafts 94, 95, 96 and 97. The drive for discharge roller 34 is taken from shaft 97 by means of gear train 36 including gears 98, 100, 101 and 102.

Figure 5:
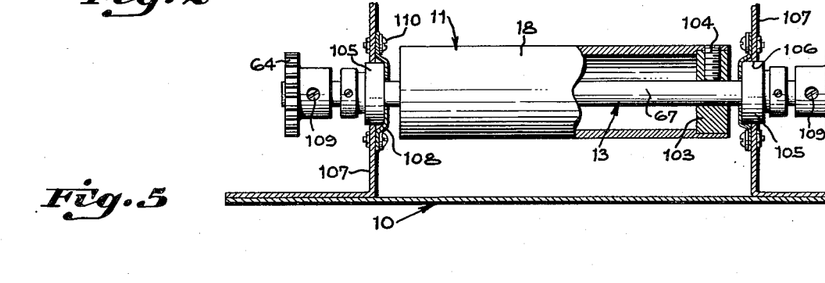
Figure 5 is a cross sectional view taken along line 5—5 of Figure 2 showing details of the roller construction.

The preferred roller construction may best be seen in Figure 5. The rollers 11 constitute hollow, cylindrical shells preferably formed from highly polished steel to permit slippage between the roller surface and dough lumps, thereby eliminating any injury to the dough when the rollers are turning beneath the lumps near the discharge end of the spacer. The rollers 11 are mounted upon shafts 13 by means of hubs 103 over which the rollers are fitted. The rollers may be secured to the hubs by press fitting or any other means, such as welding, or the like. The hubs, in turn, are held in place on shafts 13 by set screws 104 or some similar means. Shafts 13 are journaled in roller bearings 105 which reside in apertures 106 formed in side frame members 107 and which are held against transverse movement by means of plates 108 which are bolted to side frame members 107 by bolts 110. One or more sprockets 14 are secured to each of the roller shafts 13 by means of set screws 109.

Figure 6:
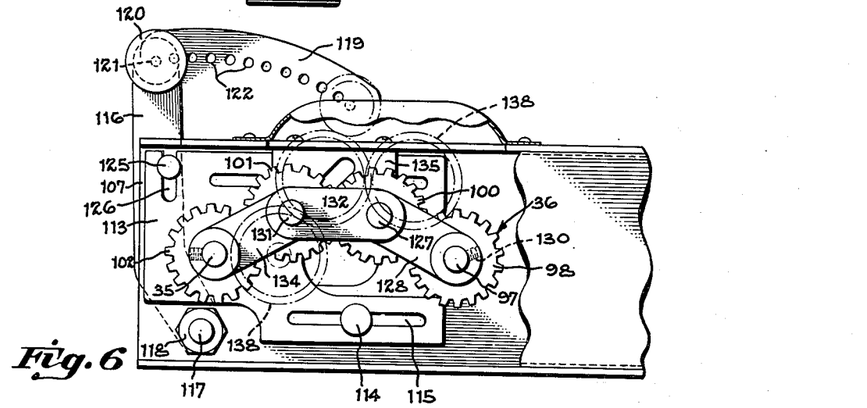
Figure 6 is a partial side view of the gear drive for the discharge roller.
Figure 7:
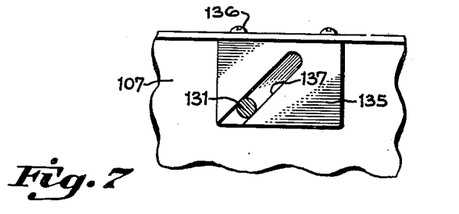
Figure 7 is a view of the guide plate for one of the shafts of the gear drive shown in Figure 6.

Discharge roller 34 is mounted on shaft 35 which turns in roller bearings 111 residing in apertures 112 provided in plates 113. Plates 113 are adapted for sliding movement toward or away from the end of the spacer and are guided during movement by pins 114 which are secured to side frame members 107 and slidably engage slots 115 in plates 113. The plates 113 and discharge roller 34 can be shifted relative to the separator roller 33, to accommodate dough lumps of varying thickness. The means for shifting discharge roller 34 include an arm 116 which is mounted upon shaft 117 which, in turn, is pivotally secured to side frame members 107 by bolts 118. Handle 120 is joined to one end of arm 116 and carries detent pin 121 which is adapted to reside in one or a series of openings 122 formed in plate 119. When arm 116 is rotated, shaft 117 is turned, along with arm 123 which is also mounted thereon. Plates 113 are forced longitudinally by the engagement of pin 124 carried by arm 116 and pin 125 carried by arm 123 with slots 126 provided in plates 113. When the desired distance is obtained between rollers 33 and 34 the plates and discharge roller are locked in position by the engagement of detent pin 121 with one of the openings 122.

As shaft 35 carrying discharge roller 34 is moved toward or away from separator roller 33, the gears 100, 101 and 102 are also moved so as to maintain a driving relationship between shaft 97 and the discharge roller. Shaft 127 carrying gear 100 is spaced from shaft 97 by means of links 128 which fit over both shafts and are held in place as by set screws 130. Shaft 131 carrying gear 101 is spaced from shaft 127 by two bearing links 132. Links 132 are relatively heavy members and are adapted to journal shafts 131 and 127. Shaft 35 is also linked to shaft 131 by two links 134. A plate 135 is secured to the side frame member 107 as by bolts 136 and is provided with a slot 137 adapted to engage shaft 131 to constrain its movement along a line defined by the slot. As shaft 35 carrying the discharge roller is shifted the gears 100, 101 and 102 are maintained in engagement by links 128, 132 and 134 and are effective to drive the discharge roller in a reverse direction from separator roller 33. The dotted gears 138 show the relative position of the gear drive with the discharge roller 34 in its extreme position inwardly from the end of the spacer.

Figure 4:
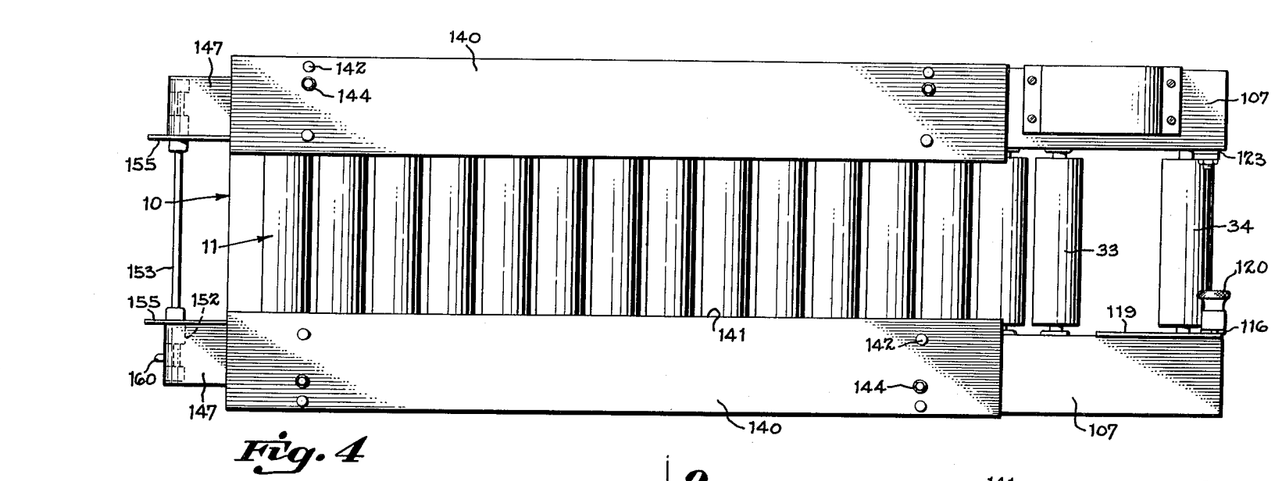
Figure 4 is a top plan view of the spacer.
Figure 8:
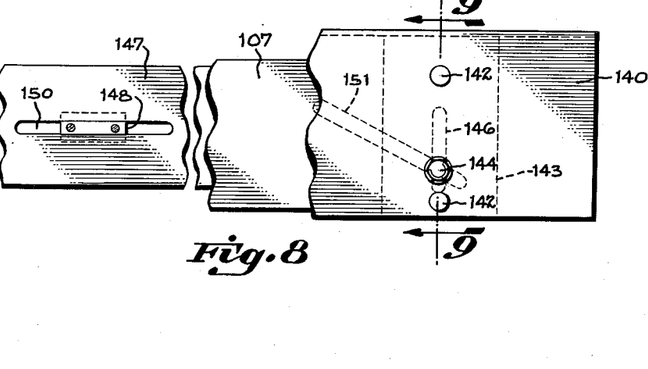
Figure 8 is a partial, enlarged top view of one of the lateral guides, part of the guide being broken away to show the relationship of the frame and sliding cam.
Figure 9:
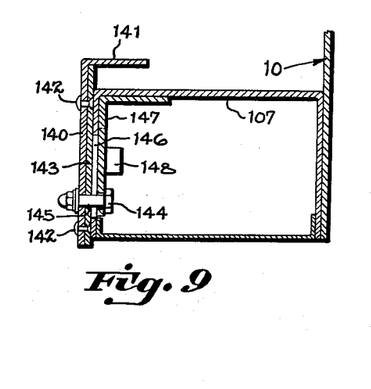
Figure 9 is a cross sectional view taken along line 9—9 of Figure 8.

The preferred embodiment of the lateral guides which function to center the dough lumps transversely on the rollers, may best be understood from a consideration of Figures 4, 8 and 9. The guides comprise L-shaped members 140 which are mounted on each side of the spacer with the foot 141 of the L extending vertically over the rollers 11. The guides are secured as by rivets 142 to transverse cam plates 143. Cam plates 143 are adapted to slide transversely over frame members 107 and are guided by bolts 144, which pass through bores 145 in cam plates 143 and guides 140, and slideably engage transverse slots 146 formed in frame members 107.

Longitudinal cams 147 are adapted to slide along frame members 107 and are constrained to longitudinal movement by means of lugs 148 which are secured to frame members 107 and slideably engage slots 150 in cams 147. Longitudinal cams 147 are also provided with diagonal slots 151 which slideably engage bolts 144. One end of the longitudinal cams is looped to receive hubs 152 provided on rod 153. Rod 153 is carried by the upper end of arm 154, which is pivotally mounted to plate 155 by means of shaft 156. Plate 155, in turn, is joined to frame members 107 as by bolts 159. Pin 157, carried by arm 154, engages slot 158 in plate 155. A locking nut 160 is mounted on pin 157 and is adapted to be tightened to secure arm 154 in a preselected position. By rotating arm 154, cam 147 is forced longitudinally and the diagonal slot 151 urges bolt 144 transversely in slot 146. Bolt 144 which is rigidly secured to guide plates 140, in turn, urges these members inwardly or outwardly over the rollers, thus, increasing or decreasing the width of the space between the guides, in which the dough lumps will be constrained. It will be noted that only arm 154 need be moved to adjust the lateral guides and that the guides advance toward the center of the rollers or recede from the center in unison so that no matter how wide the dough lump path is made, its center will always coincide with the center of the rollers. Preferably, plate 155 is calibrated and a pointer 161 is secured to arm 154 to indicate the width of the space between the guides to facilitate their adjustment.

Figure 10:
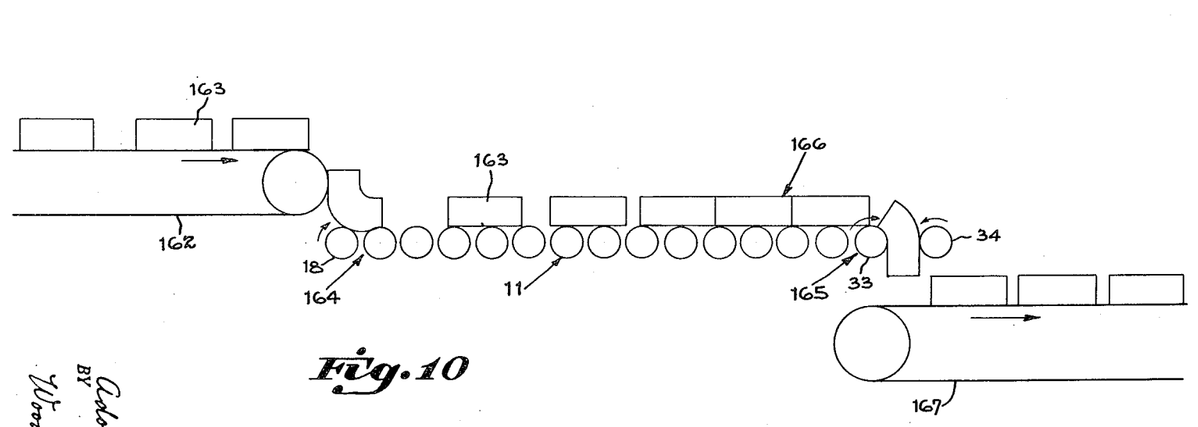
Figure 10 is a diagrammatic view showing the spacing of dough lumps on the proofer discharge conveyor, on the spacer rollers and on the spacer discharge conveyor.

The principle of the present dough lump spacer may best be seen from Figure 10 in which the proofer discharge conveyor 162 is shown carrying a plurality of dough lumps 163 which are arranged in an irregularly spaced succession. The dough lumps are dropped from the end of the conveyor 162 onto the receiving end 164 of the spacer and are preferably given a slight acceleration which may be caused either by the action of the loaves in dropping onto the first rolls of the spacer, or by contact with roller 18 which preferably rotates at a higher peripheral speed (in feet per minute) than the speed of conveyor travel.

Dough lumps 163 are then retarded by contact with the slower moving rollers adjacent to the discharge end 165 of the spacer. A succession of dough lumps 166 in endwise abutment is thus formed at the discharge end of the spacer. Finally, as each lump comes into contact with separator roller 33 it is accelerated slightly to space it a small distance from the following lump. In the preferred embodiment, the lumps are discharged downwardly between discharge roller 34 and separator roller 33, and are gripped between the two rollers to insure positive movement during discharge. The lumps are deposited, after discharge from the spacer, either directly onto the head rolls of the molder or, as shown in Figure 10, onto an intermediate conveyor 167 in an exact timed succession with a minimum, uniform distance between succeeding lumps.

Viewed functionally, in the preferred embodiment the rollers at the receiving end of the spacer serially accelerate the lumps and thereby separate any doubles which are delivered to the spacer from the proofer. The retarding rollers then form a reservoir of dough lumps so that the effect of any appreciable irregularity in dough lump spacing on the proofer discharge conveyor is eliminated and the dough lumps are fed to the separator roller in a continuous line. Finally, the separator roller which serially accelerates the lumps, provides a uniform spacing, which may be kept at an absolute minimum, between successive dough lumps. The separator roller and discharge roller additionally function to separate any doubles which, for some reason or other, were not separated at the receiving end of the spacer. The rollers which constitute the dough supporting surface in the preferred embodiment not only provide a reliable means for accurately spacing dough lumps but additionally space the lumps without causing any injury to the dough which might result in defective loaves of bread. The dough lumps arrive at the spacer from the proofer in a plastic condition and are characterized by a "skin," or relatively high surface tension, at their outer surface. So long as their "skin" is not ruptured two lumps may be brought into contact with one another and will not coalesce or adhere to one another. However, should the lumps be brought together with sufficient force to break the skin of one or both of the lumps, they will readily amalgamate and form a double.

It has been found that the tractional engagement between the rollers and dough lumps, while sufficient to permit the rollers to uniformly and reliably control the speed of the lumps, is not sufficiently large to bring the lumps together with enough force to rupture their skins. Slippage will occur between the rollers and lumps before the lumps can be abutted with sufficient force to amalgamate them.

Another factor which facilitates the spacing process while preventing injury to the dough lumps is the progressive retardation of the lumps as they move over the series of live retarder rollers. These rollers are effective to gradually decelerate the lumps to bring them gently into abutment. By virtue of their gradual slow down, the lumps are brought together with a minimum force, the magnitude of which is controlled by the number and relative speed of the retarder rollers. The more rollers which are employed to retard the lumps the less each roller must change the velocity of the lump in order to bring them together gently. As a result, each roller need have less tractional engagement with the lumps to positively control their movement, thereby further reducing the possibility of the rollers forcing lumps together with sufficient force to amalgamate them.

Figure 12:
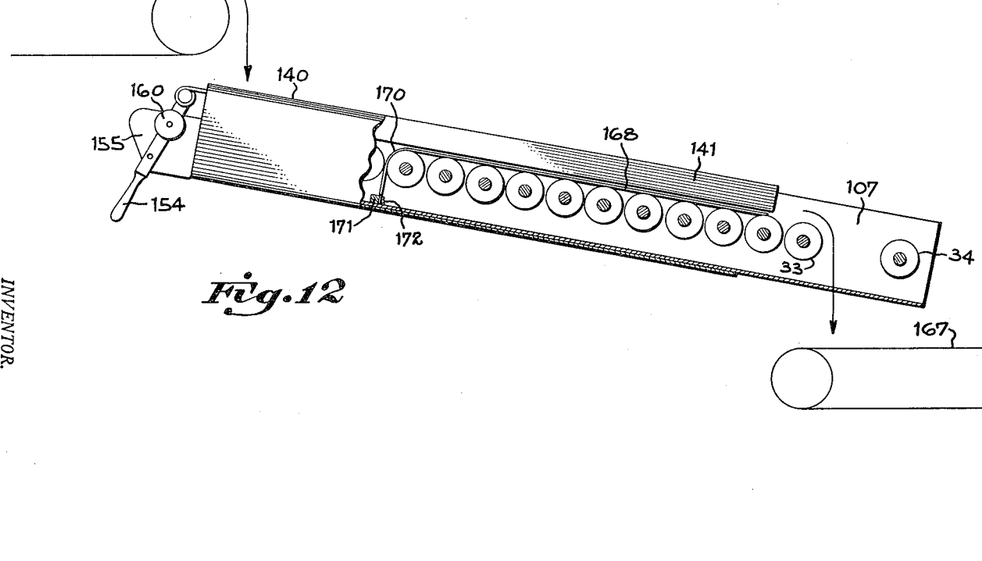
Figure 12 is a cross sectional view taken along line 12—12 of Figure 11.

The spacer may be used either in a horizontal position as shown in Figure 1, or it may be disposed at an angle with the horizontal as shown in Figure 12. If the angle to which the spacer is arranged is appreciable, it is desirable to provide a masking strip 168 which covers the center portion of the retarder rolls and is effective to counteract the accelerating effect of gravity on the dough lumps.

Figure 11:
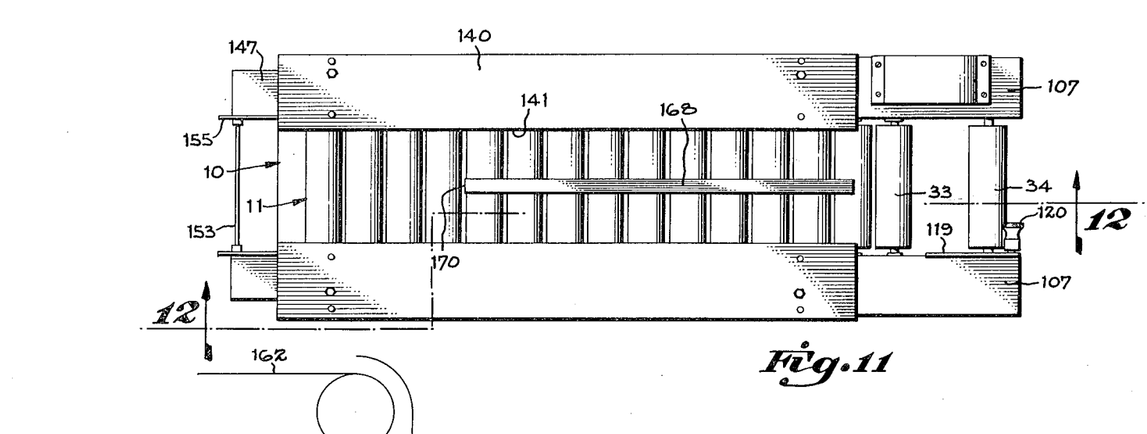
Figure 11 is a top view of a modification having a masking strip over the center portion of the rollers.

As shown in Figures 11 and 12, the masking strip 168 is constituted by a relatively narrow strip of thin material which is bent at one end for attachment to the frame. The bent end 170 is secured to cross bar 171 as by bolts 172 and the cross bar is fastened to side frame members 107 by any appropriate means. Bar 171 is preferably placed beneath the space between roller 22 and the first retarder roller 23 and extends to the final retarder roller 32. The slight resistance to lump movement provided by the masking strip slows the lumps so the retarder rolls may bring the lumps gently into abutment even though the lumps are in a sense sliding down an incline. If the angle at which the spacer is disposed is great enough, it may be desirable to increase the number of masking strips to provide the proper amount of resistance to dough lump movement to bring the lumps gently into abutment.

The output rate of the spacer may be changed to accommodate varying production rates in the bakery by means of the variable speed drive which includes variable pitch pulley 48. It will be noted that the speed of each of the rollers 11 may be increased or decreased proportionately by varying the pitch of pulley 48. Since the speed of each of the rollers varies in the same proportion, the spacer functions in an identical manner no matter at what speed it is operated. Obviously, there are many different devices, such as a variable speed gear transmission, which can be used to drive the rollers and it is to be understood that the chain drive shown is merely illustrative.

Figure 13:
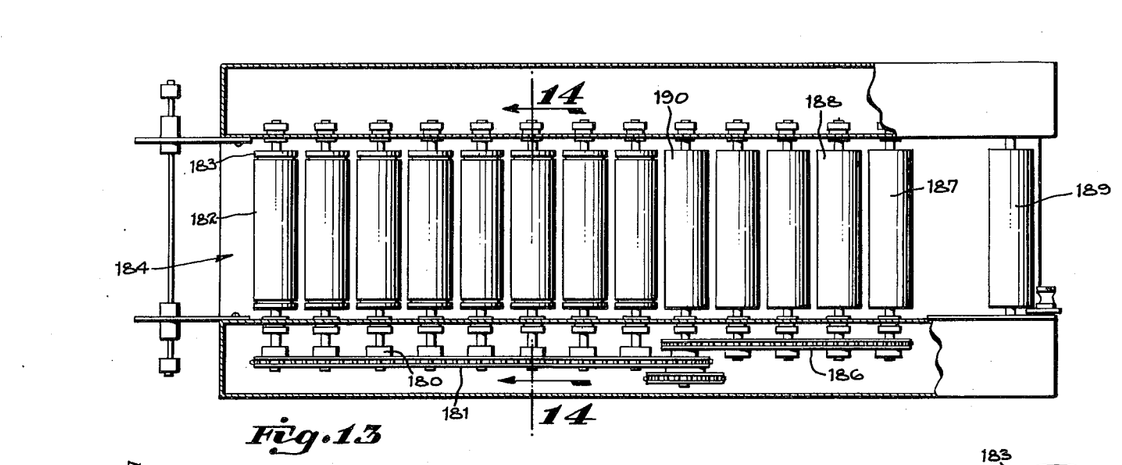
Figure 13 is a top view of a modification of my device.
Figure 14:
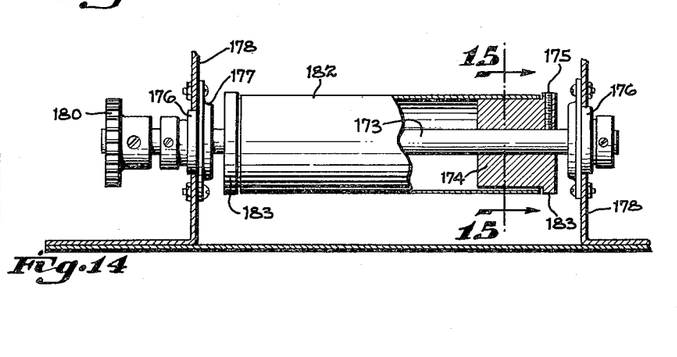
Figure 14 is a cross sectional view taken along line 14—14 of Figure 13.
Figure 15:
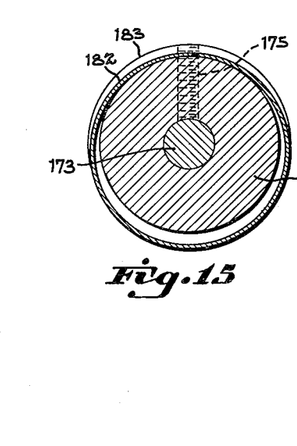
Figure 15 is a cross sectional view taken along line 15—15 of Figure 14.

A further modification of my invention is disclosed in Figures 13, 14 and 15. The dough supporting surface of this modification is constituted by two groups of rollers. One group of rollers are positively driven and are constructed in accordance with Figure 5. The rollers of the second group are frictionally driven and their construction may best be seen in Figures 14 and 15.

Each of the rollers of the latter group is constituted by a shaft 173 which carries two hubs 174, which are secured in place as by set screws 175. Shafts 173 are journaled in bearings 176 which are mounted in brackets 177 secured to frame members 178 of the spacer. A sprocket 180 is mounted upon one end of each shaft 173 for engagement with chains 181. A cylindrical shell 182 is fitted over each of the hubs 174 and is held against transverse movement by hub flanges 183. The inner diameter of shells 182 is made larger than the diameter of the hubs 174 so that the shells are loosely carried by the hubs and are frictionally rotated by them whenever the hubs are driven.

As shown in Figure 13, the rollers at the receiving end 184 of the spacer are of the type just described and are driven at a relatively high rate of speed by chain 181 which engages sprockets 180. In this modification, sprockets 180 are all rotated at the same speed, thereby simplifying the roller drive mechanism as compared to that used in the preferred embodiment. The rollers 188 at the discharge end of spacer are preferably constructed in accordance with Figure 5 and are driven by chain 186 at a lower rate of speed than the rollers at the receiving end of the spacer. The slower moving rollers 188 function to retard the dough lumps to bring them into endwise abutment before they are contacted by the separator roller. In this modification, all of the rollers 188, adjacent the discharge end, are also rotated at the same speed, with the exception of the separator roller 187 which is turned at a higher speed in order to effect a separation of the dough lumps as they are discharged from the spacer. A discharge roller 189 is also provided which functions similarly to and may be driven in the same manner as discharge roller 34 in the preferred embodiment.

In an installation employing this modification of the spacer, the dough lumps are deposited from a conveyor in an irregular succession upon the rollers at the receiving end of the spacer. Since the slippage between the shells 182 and hubs 174 is normally small, the lumps move over the first rollers at a relatively rapid rate. However, when the lumps contact the slower moving retarding rollers near the discharge end, they are slowed down and are brought into endwise abutment as in the preferred embodiment. Should the line of dough lumps in abutment extend over roller 190 and back toward the receiving end of the spacer, slippage will occur both between the hubs 174 and shells 182 and between the dough lumps and shells 182, the tractional engagement of the shells with the hubs and dough lumps being great enough to allow the lumps to be brought into abutment but being small enough to prevent their being forced together with sufficient force to cause them to amalgamate.

It will be obvious to those skilled in the art that my invention is susceptible to many modifications without departing from its basic principles. Therefore, I desire to be limited only by the scope of the following claims.

I claim:

1. A dough lump spacer comprising a plurality of parallel spaced retarding rollers constituting a dough supporting surface having a receiving end and a discharge end, a motor, means interconnecting said motor and said rollers for driving the rollers at differing rates of speed relative to each other, the rollers adjacent the discharge end being driven at a slower speed than the rollers adjacent the receiving end, and a separator roller at the discharge end of the spacer adjacent one of said retarding rollers, said separator roller being driven at a higher rate of speed than said adjacent retarding roller, whereby the dough lumps are serially accelerated.

2. A dough lump spacer comprising a plurality of parallel spaced retarding rollers constituting a dough supporting surface having a receiving end and a discharge end, means for driving said rollers at differing rates of speed relative to each other, the rollers adjacent the discharge end being driven at a slower speed than the rollers adjacent the receiving end, a separator roller at the discharge end of the spacer adjacent one of said retarding rollers, said separator roller being driven at a higher rate of speed than said adjacent roller, and a discharge roller spaced from said separator roller, and in parallel alignment therewith, said discharge roller being driven in the opposite direction from the separator roller whereby dough lumps may be forced between said discharge roller and said separator roller and discharged in a uniformly spaced succession.

3. A dough lump spacer comprising a plurality of driven rollers in parallel spaced relationship, said rollers constituting a dough supporting surface having a receiving end and a discharge end, means for driving said rollers at differing rates of speed relative to each other, each of said driven rollers rotating at a slower speed than the roller next preceding it in the path of dough lump travel, and a separator roller disposed at the discharge end of said dough carrying surface, said separator roller being driven at a higher rate of speed than said next preceding driven roller, whereby said separator roller is effective to uniformly space the dough lumps as they are discharged from the spacer.

4. A dough lump spacer adapted to receive dough lumps from a conveyor upon which said lumps are unevenly spaced and deliver them in a uniformly timed succession, said spacer comprising a receiving roller driven at a higher speed than the rate of travel of said conveyor, a series of parallel spaced retarding rollers constituting a dough supporting surface, each of said retarding rollers being driven at a slower speed than the roller next preceding it in the path of dough lump travel, a separator roller adjacent the final retarding roller, said separator roller being driven at a higher rate of speed than said final retarding roller, whereby said dough lumps are serially accelerated to space each lump from its successor.

5. A dough lump spacer comprising a plurality of parallel spaced retarding rollers constituting a dough supporting surface having a receiving end and a discharge end, a motor, means interconnecting said motor and said rollers for driving the rollers at differing rates of speed relative to each other, the rollers adjacent the discharge end being driven at a slower speed than the rollers adjacent the receiving end, a masking strip overlaying a plurality of said retarder rollers, said masking strip being effective to offer resistance to the movement of said dough lumps, and a separator roller at the discharge end of the spacer adjacent one of said retarding rollers, said separator roller being driven at a higher rate of speed than said adjacent retarding roller, whereby the dough lumps are serially accelerated.

6. A dough lump spacer comprising a plurality of driven rollers in parallel spaced relationship, said rollers constituting a dough supporting surface having a receiving end and a discharge end, means for driving said rollers at differing rates of speed relative to each other, each of said driven rolers rotating at a slower speed than the roller next preceding it in the path of dough lump travel, a masking strip extending in the line of dough lump travel over a plurality of said driven rollers, said masking strip partially retarding the movement of said dough lumps, and a separator roller disposed at the discharge end of said dough carrying surface, said separator roller being driven at a higher rate of speed than said next preceding driven roller, whereby said separator roller is effective to uniformly space the dough lumps as they are discharged from the spacer.

7. A dough lump spacer comprising a plurality of parallel spaced rollers constituting a dough supporting surface having a receiving end and a discharge end, means for driving said rollers at the receiving end at a higher rate of speed than the rollers at the discharge end, whereby the dough lumps are brought into endwise abutment, each of said rollers at the receiving end comprising a plurality of hubs, a shell loosely mounted over hubs, said hubs frictionally driving said shells, the frictional engagement of the shells with the hubs and dough lumps being insufficient to cause the lumps to be abutted with the force necessary to amalgamate them, and a discharge roller, said discharge roller being driven at a rate of speed higher than the next preceding roller in the line of dough lump travel whereby the lumps are serially accelerated to space them a uniform distance apart.

8. A dough lump spacer comprising a plurality of parallel spaced retarding rollers constituting a dough supporting surface having a receiving end and a discharge end, a motor, means interconnecting said motor and said rollers for driving the rollers at differing rates of speed relative to each other, said means including a sprocket associated with each of said rollers and a plurality of chains in engagement with said sprockets, the number of teeth on said sprockets being varied to vary the relative speed of the rollers associated therewith, the rollers adjacent the discharge end being driven at a slower speed than the rollers adjacent the receiving end, and a separator roller at the discharge end of the spacer adjacent one of said retarding rollers, said separator roller being driven at a higher rate of speed than said adjacent retarding roller whereby the dough lumps are serially accelerated to uniformly space them.

References Cited in the file of this patent

UNITED STATES PATENTS

| | | |
|---|---|---|
| 635,177 | McCabe | Oct. 17, 1899 |
| 733,804 | Blaisdell | July 14, 1903 |
| 770,260 | Cahill | Sept. 20, 1904 |
| 872,457 | Russel | Dec. 3, 1907 |
| 1,160,792 | Houten | Nov. 16, 1915 |
| 1,457,353 | Dreher | June 5, 1923 |
| 1,761,199 | Drake | June 3, 1930 |
| 1,828,232 | Rowe | Oct. 20, 1931 |
| 1,831,015 | Mare | Nov. 10, 1931 |
| 2,496,548 | Rosa | Feb. 7, 1950 |
| 2,701,049 | Kendall et al. | Feb. 1, 1955 |

FOREIGN PATENTS

| | | |
|---|---|---|
| 527,290 | Germany | June 16, 1931 |
| 609,844 | Great Britain | Oct. 7, 1948 |